US008731918B2

(12) United States Patent
Wasserblat et al.

(10) Patent No.: US 8,731,918 B2
(45) Date of Patent: May 20, 2014

(54) METHOD AND APPARATUS FOR AUTOMATIC CORRELATION OF MULTI-CHANNEL INTERACTIONS

(75) Inventors: Moshe Wasserblat, Maccabim (IL); Omer Gazit, Ramat Hasharon (IL)

(73) Assignee: Nicesystems Ltd., Ra'anana (IL)

( * ) Notice: Subject to any disclaimer, the term of this patent is extended or adjusted under 35 U.S.C. 154(b) by 419 days.

(21) Appl. No.: 13/032,660

(22) Filed: Feb. 23, 2011

(65) Prior Publication Data

US 2012/0215535 A1    Aug. 23, 2012

(51) Int. Cl.
*G10L 15/00*    (2013.01)
(52) U.S. Cl.
USPC ........................................... 704/231; 704/251
(58) Field of Classification Search
CPC . H04M 3/4936; G10L 15/22; G10L 15/1815; G06F 17/28; G06F 17/3087; G06F 9/54
USPC .................. 704/231–237, 251–257
See application file for complete search history.

(56) References Cited

U.S. PATENT DOCUMENTS

| 5,502,774 | A   | * | 3/1996  | Bellegarda et al. | 382/159 |
| 5,855,000 | A   | * | 12/1998 | Waibel et al.     | 704/235 |
| 6,904,405 | B2  | * | 6/2005  | Suominen          | 704/235 |
| 7,716,039 | B1  | * | 5/2010  | Bangalore et al.  | 704/9   |
| 8,077,975 | B2  | * | 12/2011 | Ma et al.         | 382/187 |
| 8,204,737 | B2  | * | 6/2012  | Suominen          | 704/9   |
| 2003/0055655 | A1 | * | 3/2003 | Suominen          | 704/276 |
| 2005/0171783 | A1 | * | 8/2005 | Suominen          | 704/276 |
| 2008/0120102 | A1 | * | 5/2008 | Rao               | 704/235 |
| 2008/0221893 | A1 | * | 9/2008 | Kaiser            | 704/257 |

* cited by examiner

*Primary Examiner* — Douglas Godbold
(74) *Attorney, Agent, or Firm* — Soroker-Agmon

(57) ABSTRACT

A method and apparatus for multi-channel categorization, comprising capturing a vocal interaction and a non-vocal interaction, using logging or capturing devices; retrieving a first word from the vocal interaction and a second word from the non-vocal interaction; assigning the vocal interaction into a first category using the first word; assigning the non-vocal interaction into a second category using the second word; and associating the first category and the second category into a multi-channel category, thus aggregating the vocal interaction and the non-vocal interaction.

20 Claims, 5 Drawing Sheets

METHOD AND APPARATUS FOR AUTOMATIC CORRELATION OF MULTI-CHANNEL INTERACTIONS

TECHNICAL FIELD

The present disclosure relates to interaction analysis in general, and to a method and apparatus for correlating interactions captured through different channels, in particular.

BACKGROUND

Large organizations, such as commercial organizations, financial organizations or public safety organizations conduct numerous interactions with customers, users, suppliers or other persons on a daily basis. A large part of these interactions are vocal, or at least comprise a vocal component, while others may include text in formats such as e-mails, chats, accessing through the web or others.

However, interactions received on different channels are usually handled by different staff and in different methods. For example, vocal interactions as described above are handled by call center personnel, which sometimes belong to an external or even offshore party and are not part of the organization, while other interactions are handled by other teams.

Thus, this division may be limiting when trying to gain business insight as related to the organization as a whole, for example revealing and understanding customer satisfaction or business and operational issues of the organization. The limitation is especially acute when a customer contacts the organization several times by different channels, or when different customers contact the call center using different channels, concerning the same or similar issues.

There is therefore a need in the art for a method and apparatus that will enable an organization to identify business issues and relate to customer interactions regardless of the channels through which they are received.

SUMMARY

A method and apparatus for categorizing interactions in a call center of an organization.

One aspect of the disclosure relates to a method for categorizing interactions in a call center of an organization, the method comprising: capturing one or more vocal interactions and one or more non-vocal interaction, using logging or capturing devices; retrieving one or more first words from one or more of the vocal interactions; retrieving one or more second words from one or more of the non-vocal interactions; assigning one or more of the vocal interactions into a first category using any of the first words; assigning one or more of the non-vocal interactions into a second category using any of the second words; and associating the first category and the second category into a multi-channel category, thus aggregating the one or more vocal interactions and the one or more non-vocal interactions. Within the method, the first category and the second category are optionally pre-determined sub-categories, and associating the first category and the second category optionally comprises unifying the pre-determined sub-categories. Within the method, the first category and the second category are optionally clusters, and associating the first category and the second category optionally comprises unifying the clusters. The method can further comprise performing initial filtering for selecting interactions to be processed. Within the method, the initial filtering optionally relates to Computer-Telephony-Integration data or to Customer-Relationship-Management data or to meta data associated with any of the vocal interactions or the non-vocal interactions. The method can further comprise filtering the vocal interactions. Within the method, filtering the vocal interactions optionally relates to emotion detection, talk analysis, accent identification or language identification. The method can further comprise filtering non-vocal interactions. Within the method, filtering the non-vocal interaction optionally relates to sentiment analysis. The method can further comprise normalization and injection of any of the vocal interactions or the non-vocal interactions into a unified format. The method can further comprise analyzing the multi-channel category.

Another aspect of the disclosure relates to an apparatus for multi-channel categorizing interactions in a call center of an organization, comprising: a logging or capturing component for capturing one or more vocal interactions and one or more non-vocal interactions; an audio analysis engine for retrieving one or more first words from any of the vocal interactions; a text analysis engine for retrieving one or more second words from any of the non-vocal interactions; a grouping component for assigning the any of the vocal interactions into a first category using any of the first word and assigning any of the non-vocal interactions into a second category using any of the second words; and an aggregation component for associating the first category and the second category into a multi-channel category, thus aggregating any of the vocal interactions and any of the non-vocal interaction. Within the apparatus, the first category and the second category are optionally pre-determined sub-categories, and the aggregation component optionally unifies the first category and the second category into one or more categories. Within the apparatus, the first category and the second category are optionally clusters, and the aggregation component optionally unifies the first category and the second category into one or more clusters. Within the apparatus, the audio analysis engine is optionally a word spotting engine or a speech to text engine. The apparatus can further comprise one or more of the engines selected from the group consisting of: emotion detection engine; talk analysis engine; call flow analysis engine; accent identification engine; and language identification engine. The apparatus can further comprise a normalization and injection component for normalizing and injecting any of the vocal interactions or the non-vocal interactions into a unified format. The apparatus can further comprise an advanced analysis engine for analyzing the multi-channel category. The apparatus can further comprise a filtering component for filtering out interactions unsuitable for further analysis.

Yet another aspect of the disclosure relates to a computer readable storage medium containing a set of instructions for a general purpose computer, the set of instructions comprising capturing one or more vocal interactions and one or more non-vocal interactions, using logging or capturing devices; retrieving one or more first words from any of the vocal interactions; retrieving one or more second words from any of the non-vocal interaction; assigning any of the vocal interactions into a first category using any of the first words; assigning any of the non-vocal interactions into a second category using any of the second words; and associating the first category and the second category into a multi-channel category, thus aggregating any of the vocal interactions and the non-vocal interactions.

BRIEF DESCRIPTION OF THE DRAWINGS

The present invention will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
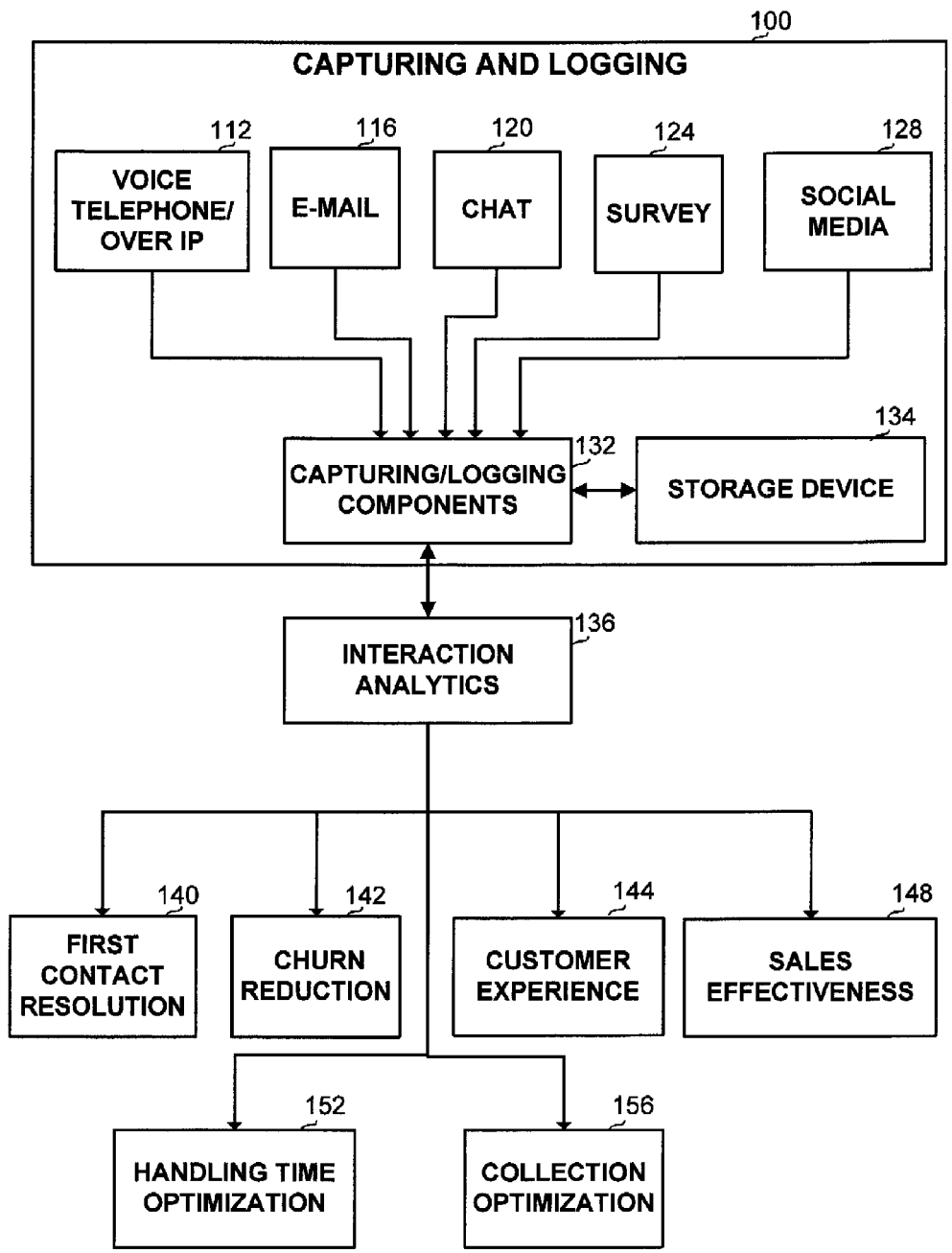
FIG. 1 is a schematic illustration of an apparatus for real-time analytics and a typical environment in which the apparatus is used, in accordance with the disclosure.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter relates to information relevant to a customer of an organization which is dispersed over a number of channels such as phone, e-mail, chat or others, optionally handled by multiple people wherein information is not passed between the different entities, so that the client is handled in a suboptimal manner. A similar technical problem may occur with a multiplicity of customers dealing with similar problems through one or more channels. Yet another technical problem is the non-uniform handling methods, skills and knowledge throughout the organization, so for example one problem may be handled better by the call center, while another problem is handled better by chat personnel.

Technical aspects of the solution can relate to an apparatus and method for capturing interactions from various sources and channels, processing them in analogous manners and unifying them into multi-channel categories, so as to get information which is organization-wise relevant, whether related to one customer or to a multiplicity of customers.

The method and apparatus provide interaction analytics and multi-channel categorization based on data extracted from the interactions, as well as meta data related to the interactions. Calls are grouped automatically based on common data and content, thus gaining significant insight related to customer experience and other business issues. The insights may be relevant both for a specific customer whose multi-channel interactions are being analyzed, and for the overall aggregate impact on customer service levels and operational efficiency in the organization.

For example, if a customer has contacted the call center regarding a dispute three or more times via two or three different channels over the past week, the system can generate an alert to a supervisor or another person in charge.

On the organizational level, if several customers contacted the call center thorough different channels regarding the same topic, the system will group the different interactions from all channels into one category, and will generate reports or raise an alert addressing the business issue.

In another aspect, linking interactions through a particular category may improve agent behavior, professionalism and performance, and call center core processes. For example, the method and apparatus may provide indication that a so customer has contacted the call center several times and talked with different agents, so that the behavior and professionalism of different agents can be assessed and compared.

In another example, it may be measured that a first group of agents handling chat interactions are able to solve a technical issue on the first call with average handling time of 5 minutes, while an agent group which handles voice interactions solves the same technical issue after two calls and total time of 10 minutes. Each agent group may be behaving in accordance with the training it received, but looking at the overall picture may reveal that the guidelines and processes need to be adjusted, for example by improving technical knowledge transfer between categories.

The method and apparatus comprise normalizing the interactions and storing them in a consistent manner regardless of the channels through which they were captured, followed by categorizing the interactions into categories, and then merging or uniting similar categories comprising interactions received through different channels. Then any type of analysis can be performed, including multi-channel analysis to reveal data from the interactions and categories.

Referring now to FIG. 1, showing a block diagram of the main components in the apparatus and in a typical environment in which the disclosed method and apparatus are used. The environment is preferably an interaction-rich organization, typically a call center, a bank, a trading floor, an insurance company or another financial institute, a public safety contact center, an interception center of a law enforcement organization, a service provider, an internet content delivery company with multimedia search needs or content delivery programs, or the like. Segments, including broadcasts, interactions with customers, users, organization members, suppliers or other parties are captured, thus generating input information of various types. The information types optionally include auditory segments, video segments, textual interactions, and additional data. The capturing of voice interactions, or the vocal part of other interactions, such as video, can employ many forms, formats, and technologies, including trunk side, extension side, summed audio, separate audio, various encoding and decoding protocols such as G729, G726, G723.1, and the like.

The interactions are captured using capturing or logging components 100. Vocal interactions usually include telephone or voice over IP interactions 112, including interactions through telephone of any kind, including landline, mobile, satellite phone or others. The voice typically passes through a PABX (not shown), which in addition to the voices of two or more sides participating in the interaction collects additional information discussed below. Further vocal interactions can be captured through voice over IP channels, which possibly pass through a voice over IP server (not shown). It will be appreciated that voice messages are optionally captured and processed as well, and that the handling is not limited to two-sided conversations. The interactions can further include face-to-face interactions, such as those recorded in a walk-in-center, microphone, intercom, vocal input by external systems, broadcasts, files, streams, video conferences which comprise an audio component, and additional sources of auditory data.

Other captured interactions may include e-mails 116, chat sessions 120, survey results 124 or social media content 128. These interactions can be captured using any existing technologies, such as various encoding and protocols as detailed above for voice segments. Screen capture devices can be used for capturing events occurring on an agents' screen, such as entered text, typing into fields, activating controls, or any other data which may be structured and stored as a collection of screen events rather than screen capture.

The interaction capture may be performed by data collection enabled by different connectors for each channel type and vendor. For example, a corresponding connector may be implemented for each type of mail server, in order to capture incoming and outgoing mail messages exchanged through the server. Other connectors may be implemented from chat servers, survey systems and social media servers.

Each connector may connect to the relevant text interaction service or source, collect relevant data which may include the actual content exchanged as well as meta-data, optionally based on pre-defined rules regulating which interactions are to be captured.

It will be appreciated that the captured sources are not limited to the ones discussed above, but that other sources can be used as well, including independent data sources or auxiliary data sources such as Computer-Telephony-Integration (CTI) systems, information from Customer-Relationship-Management (CRM) systems, or the like.

Data from all the above-mentioned sources and others is captured and may be logged by capturing/logging component 132. Capturing/logging component 132 comprises a computing platform executing one or more computer applications as detailed below. The captured data may be stored in storage 134 which is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like. The storage can be common or separate for different types of captured segments and different types of additional data. The storage can be located onsite where the segments or some of them are captured, or in a remote location. The capturing or the storage components can serve one or more sites of a multi-site organization. A part of, or storage additional to storage 134 may store data related to the categorization such as categories or sub-categories, criteria, associated actions, or the like. Storage 134 may also contain data and programs relevant for audio analysis, such as speech models, language models, lists of words to be spotted, or the like.

It will be appreciated that interactions may be captured in accordance with rules. In one example, only interactions with external entities may be recorded, in other examples only interactions with VIP customers are recorded, or the like.

Interaction analytics component 136 receives the interactions and analyzes them in a multi-channel manner, so that information received from different sources is normalized and processed, as detailed in association with FIGS. 2-5 below.

In some embodiments, the interactions may be streamed into interaction analytics component 136 and analyzed as they are being received. In other embodiments, the interactions may be received as one or more chunks, for example 2-30 seconds chunk of audio, text chunks of chat sessions, or the like.

The results of interaction analytics component 136 can be used in a variety of applications, such as but not limited to any of the following: first contact resolution component 140, which provides assistance to a handling agent so that the customer issue is solved on the first interaction; churn reduction component 142 for churn-related analysis aimed at reducing the churn rate of customers; customer experience analysis component 144 for analyzing different aspects of customer experience across the organization; sales effectiveness component 148 for enhancing the effectiveness of sales forces, re-sales or the like; handling time optimization component 152 for optimizing the handling time by agents, for example by enhancing the agent training, better assignment of agents, knowledge passing within the organization, or the like; collection optimization component 156 for enhancing the rules in accordance with which interactions are captured, or the like.

It will be appreciated that any different, fewer or additional actions can be used for various organizations and environments. Some components can be unified, while the activity of other described components can be split among multiple components. It will also be appreciated that some implementation components, such as process flow components, storage management components, user and security administration components, audio enhancement components, audio quality assurance components or others can be used.

The apparatus may comprise one or more computing platforms, executing components for carrying out the disclosed steps. Each computing platform can be a general purpose computer such as a personal computer, a mainframe computer, or any other type of computing platform that is provisioned with a memory device (not shown), a CPU or microprocessor device, and several I/O ports (not shown). The components are preferably components comprising one or more collections of computer instructions, such as libraries, executables, modules, or the like, programmed in any programming language such as C, C++, C#, Java or others, and developed under any development environment, such as .Net, J2EE or others. Alternatively, the apparatus and methods can be implemented as firmware ported for a specific processor such as digital signal processor (DSP) or microcontrollers, or can be implemented as hardware or configurable hardware such as field programmable gate array (FPGA) or application specific integrated circuit (ASIC). The software components can be executed on one platform or on multiple platforms wherein data can be transferred from one computing platform to another via a communication channel, such as the Internet, Intranet, Local area network (LAN), wide area network (WAN), or via a device such as CDROM, disk on key, portable disk or others.

Figure 2:
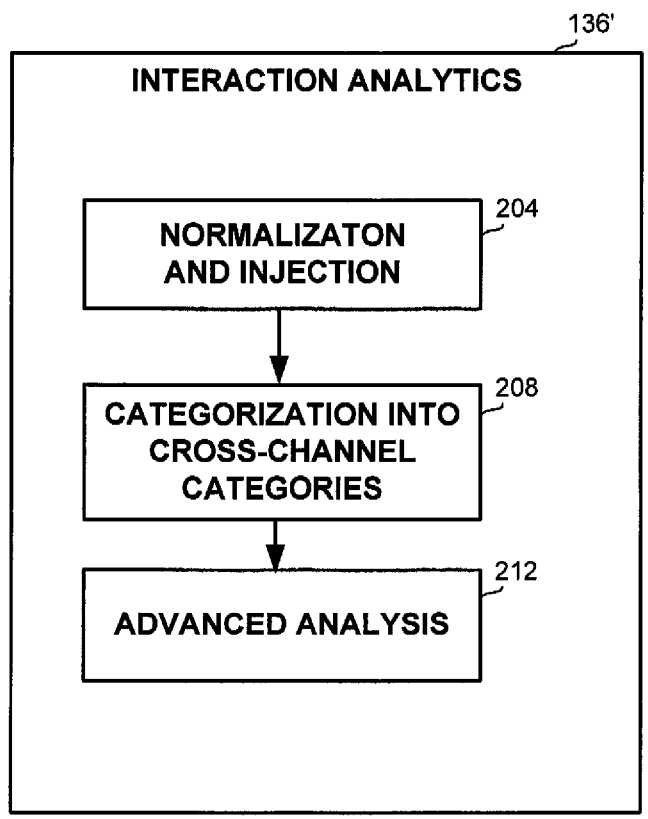
FIG. 2 is a schematic flowchart detailing the method of interaction analytics, in accordance with the disclosure.

Referring now to FIG. 2, showing a schematic flowchart detailing the method of interaction analytics component 136 of FIG. 1. The method, generally indicated 136', comprises normalization and injection 204, categorization 208 and advanced analysis 212.

At normalization and injection 204 the interactions and metadata are normalized so that they can be processed in analogous manner, and injected into unified storage. Normalization and injection 204 is further detailed in association with FIG. 3 below.

On categorization 208 the data is categorized into multi-channel categories, such that each category may contain interactions captured from two or more different channels.

On advanced analysis 212, the data and the categories into which each interaction is categorized are further analyzed to reveal multi-channel or organization-wide information.

Figure 3:
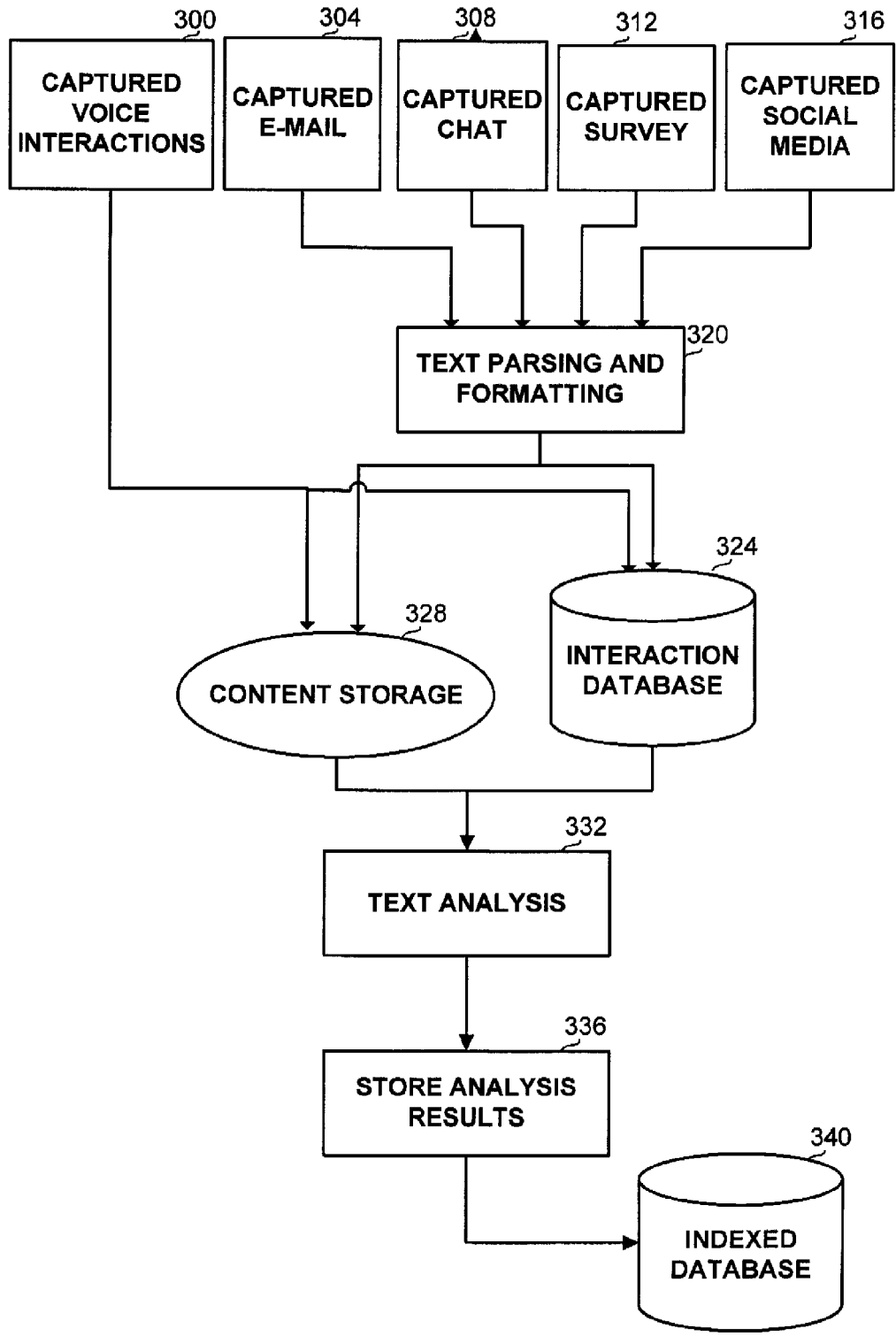
FIG. 3 is a detailed flowchart of method for interaction normalization and injection, in accordance with the disclosure.

Referring now to FIG. 3, showing a detailed flowchart of normalization and injection 204.

Normalization and injection 204 receives interactions of different sources, which may include but are not limited to captured voice interactions 300 which may include telephone interactions, voice over IP interactions or others; captured e-mail interactions 304; captured chat sessions 308; captured surveys 312 which may be in any form such as table, text, proprietary format, or the like; or captured social media 316 which may include data items such as text from social networks.

The textual data, including captured e-mail interactions 304, captured chat sessions 308, captured surveys 312 and captured social media 316 are then parsed and formatted at text parsing and formatting 320 into a unified format. Parsing the text provides for extracting data related to an interaction, and for converting its content into a unified format so that interactions captured from different channel types are later handled in the same manner. The unified format may comprise for example, the text, the text as stemmed with the stop words removed, in a tabular form in which the number of occurrences for each word is indicated, or the like.

The captured interactions are then stored in interaction database 324. Additional data such as the interactions in unified format or meta data such as date and time of an interaction, identifying data of the interaction or the like, are stored in content storage 324.

Once the text interactions and the additional data are stored in a unified format, text analysis 332 performs normalization of the unified format and different types of text analysis, which may include but is not limited to Natural Language Processing (NLP), key phrases detection or scoring, sentiment analysis, or the like.

The analysis results may be stored on 336 in any format uniform for all channel types, which may be related to as a concordance or index file, for example in XML or JSON format. The analysis results may also be indexed into an indexed database 340 which enables text searches and advanced aggregated analysis based on text and meta-data, such as a Lucene Text Indexer database.

The vocal interactions are also stored on interaction database 324 while their meta data, including for example date and time of an interaction, called number, calling number, CTI information, CRM information or the like are stored on content storage 328.

Physically, interaction database 324 and content storage 328 can reside on the same storage device or each of them can reside on one or more different devices.

Figure 4:
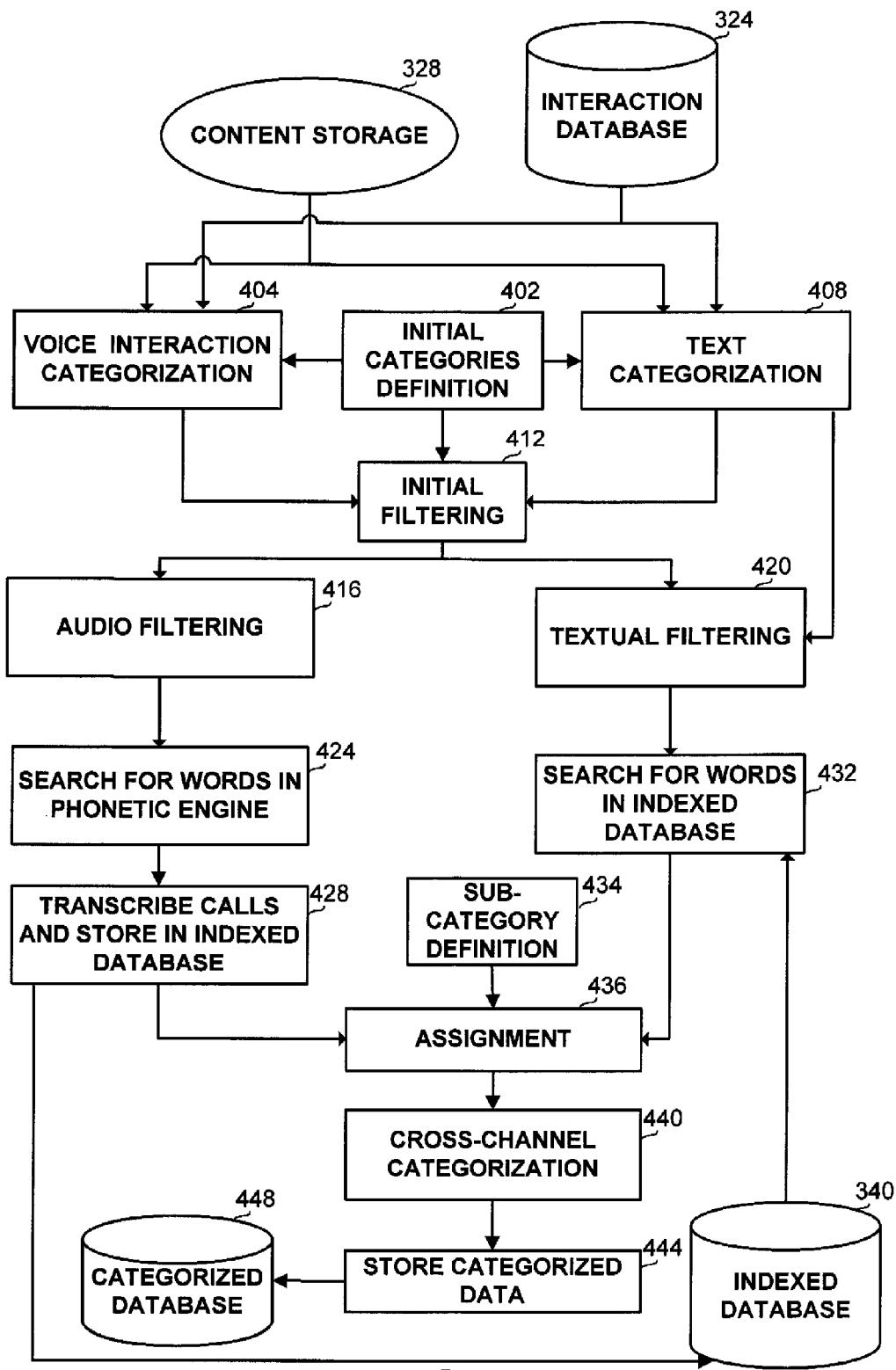
FIG. 4 is a detailed flowchart of method for multi-channel categorization, in accordance with the disclosure.

Referring now to FIG. 4, showing a detailed flowchart of an exemplary embodiment of multi-channel categorization step 208 of FIG. 2.

The input to the categorization method is received from interaction database 324 and content storage 328 as populated on normalization and injection step 204.

The categorization process is operative in that interactions are eventually categorized into multi-channel main categories which include related interactions captured from different channel types.

On 402, initial categories are defined, which are mainly based on technical data, such as meta data of the interactions, CTI information, CRM information, spoken language, or the like. The initial categories may be defined by rules, such as "VIP calls", calls dialed to a specific number, or the like.

Voice interactions are filtered on voice categorization 404 into one or more of the initial categories, based for example on the meta data of the interaction as stored in content storage 328.

A textual interaction is categorized on text categorization 408 into one or more of the initial categories, based on the text, on the information as indexed or on the meta data of the interaction as stored in content storage 328.

On optional initial filtering 412, the interactions that were categorized into one or more of the initial categories are filtered and one or more of them are passed to further processing.

The filtered interactions, or all interactions if filtering is omitted, are processed in accordance with their type, separately for voice interactions and for text interactions.

Vocal interactions may be further filtered on audio filtering step 416 using emotion analysis, talk analysis, accent analysis or any other analysis which does not require significant processing resources, and may not provide lexical content of the interaction.

The audio interactions that passed filtering 416 are passed to optional step 424 in which particular words or phrases may be searched for by a phonetic engine, followed by transcribing the calls 428 and indexing the results in indexed database 340. In some exemplary embodiments, only the calls that matched the word or phrase query are been transcribed. Thus, the content of the interaction is extracted and indexed. The phonetic engine search searches for a particular list of words rather than a full transcription, but provides these words with higher accuracy. Therefore phonetic search may be employed for the most important words, and the located instances of these words are combined into the full transcription generated on step 428.

The textual interactions may also undergo optional additional filtering 420, such as sentiment analysis in which words indicating emotions are searched for. The interactions that passed the filtering, i.e., contain sentiment, may go through word search 432.

Using the results of word search 424 and transcription 428 for vocal interactions, and word search 432 for non-vocal interactions such as textual interactions, the calls are assigned into categories on assignment 436, for example by clustering or by sub-categorization into sub-categories.

It will be appreciated that the word search can be any combination of word search 424 and word search 432 with and/or and possibly other operators. For example a search can be conducted for word 1 and any of word 2 or word 3, i.e., word 1 AND (word 2 OR word 3).

Assignment 436 may use sub-categories defined on sub-category definition step 434. The sub-categories may be separate for vocal and textual interactions, since for example different words may be used in spoken and written language.

For example, in a vocal interaction in which a customer is leaving a company he may include the word "leave", while in writing the customer may use "disconnect".

Alternatively, assignment 436 can be implemented as a clustering step. In categorization, the categories are created in advance, and assignment criteria is defined for each category. The categories are thus pre-created and their definitions do not depend on the available interactions to be categorized. Also, in categorization, each interaction can be categorized into zero, one, or more categories.

In clustering, however, the interactions are divided into clusters such that: the clusters are not pre-defined but are rather created based on the available interactions; and each interaction is assigned to exactly one cluster.

On multi-channel categorization 440, related clusters or sub-categories are unified and correlated. Thus, if assignment 436 comprises categorization, sub-categories related to the same subject but to two or more different interaction types are unified, while if assignment 436 comprises clustering, clusters related to the same subject but to two or more different interaction types are unified, For example, a "technical problem X" category may be created which aggregates the vocal interactions categorized into "problem X telephone calls", and textual interactions categorized into "problem X e-mails", "problem X chat sessions", etc.

Correlating categories can be performed by a user using a user-interface in which categories from different channels are explicitly combined. In alternative embodiments, the correlation can be done automatically, by using semantic inference engines to combine categories having the same semantic context or information.

On storing step 444 the assigned interactions and their clusters or parent and sub-categorizations are stored in a categorized database 448, such as a multi-dimensional database for example online analytical processing (OLAP) database.

Figure 5:
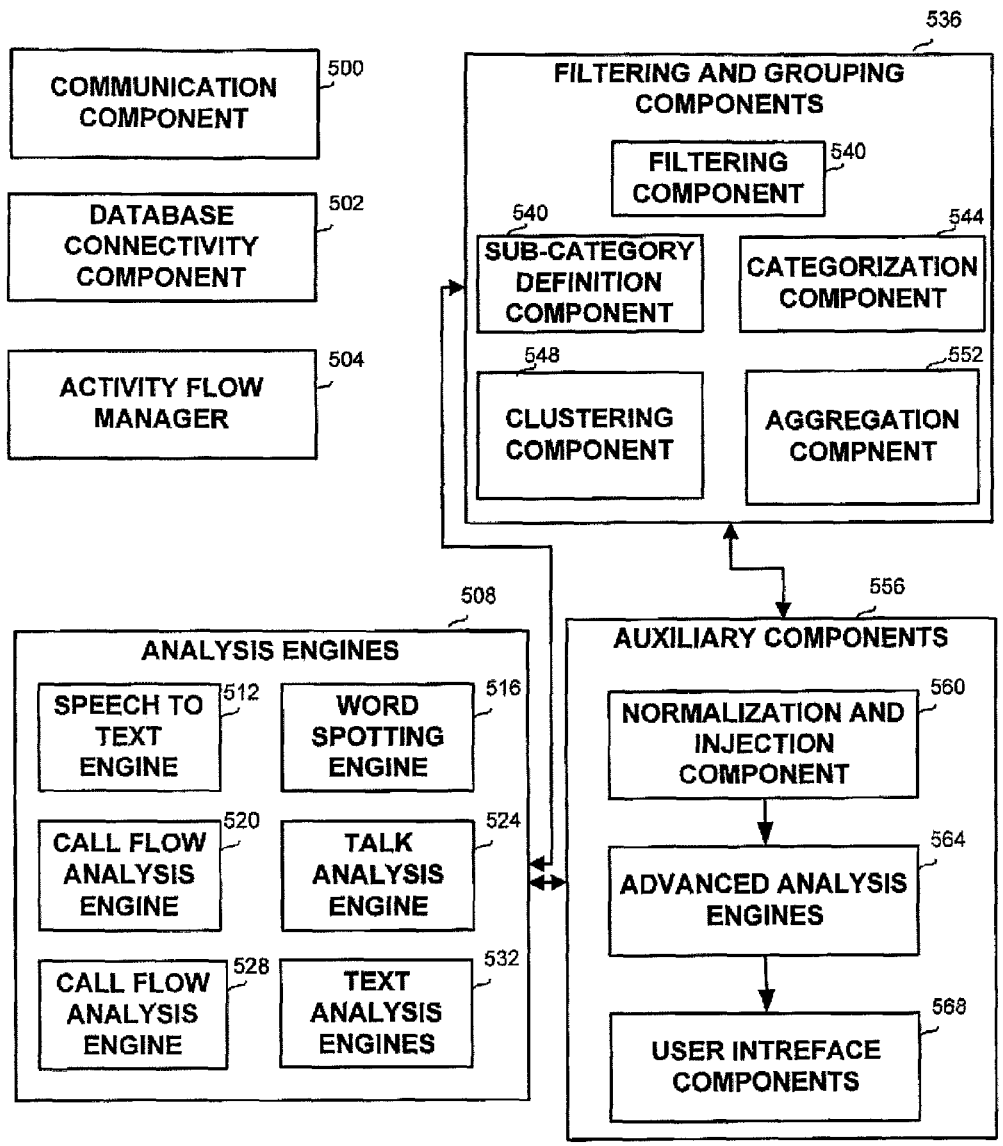
FIG. 5 is a schematic illustration of an exemplary embodiment of an apparatus for multi-channel categorization, in accordance with the disclosure.

Referring now to FIG. 5, showing an exemplary embodiment of an apparatus for multi-channel categorization, which details component 136 of FIG. 1, and provides an embodiment for the method of FIG. 4.

The exemplary apparatus comprises communication component 500 which enables communication among other components of the apparatus, and between the apparatus and components of the environment, such as storage 134, logging and capturing component 132, or others. Communication component 500 can be a part of, or interface with any communication system used within the organization or the environment shown in FIG. 1.

The apparatus further comprises database connectivity component 502 for storing and retrieving information from one or more databases, including raw interaction data and meta data, data extracted from the interactions, or grouping information.

The apparatus comprises also activity flow manager 504 which manages the data flow and control flow between the components within the apparatus or between the apparatus and the environment.

The apparatus comprises analysis engines 508, filtering and grouping components 536, and auxiliary components 556.

Filtering and grouping components 536 comprise filtering component 538 for filtering the interactions in order to select the interactions that should be further analyzed and categorized. For example, too short or too long interactions may not be suitable for such analysis and may be filtered out.

Filtering and grouping components 536 optionally comprise sub-category definition component 540 for defining sub-categories into which the interactions are assigned, based on the extracted information, and categorization component 544 for categorizing an interaction into one or more of the defined sub-categories. Alternatively, or in addition, filtering and grouping components 536 comprise clustering component 548 which receives a collection of transcriptions or other textual items extracted from interactions, and divides the interaction into clusters.

Filtering and grouping components 536 further comprise aggregation component 552 for aggregating two sub-categories or two clusters into a unified multi-channel category or cluster.

Analysis engines 508 are used for analyzing audio or text interactions. Analysis engines 508 may comprise any one or more of the engines detailed hereinafter.

Speech to text engine 512 may be any proprietary or third party engine for transcribing an audio signal into text or a textual representation, and can be used for transcribing calls on step 428.

Word spotting engine 516 detects the appearance within the audio of words from a particular list. In some embodiments, after an initial indexing stage, any word can be search for, including words that were unknown at indexing time, such as names of new products, competitors, or others. Word spotting engine 516 and can be used for word searching on step 424.

Call flow analysis engine 520 analyzes the flow of the interaction, such as the number and timing of holds, number of transfers, or the like. Call flow analysis engine 520 can be used for initial filtering 412 or audio filtering 416.

Talk analysis engine 524 analyzes the talking within an interaction: for what part of the interaction does each of the sides speak, silence periods on either side, mutual silence periods, talkover periods, or the like. Talk analysis engine 524 can be used for initial filtering 412 or audio filtering 416.

Emotion analysis engine 528 analyzes the emotional levels within the interaction: when and at what intensity is emotion detected on either side of an interaction. Emotion analysis engine 528 can be used on initial filtering 412 or audio filtering 416.

Text analysis engine 532 may comprise tools for analyzing text extracted from an interaction, for example for sentiment analysis 420, word search 432 or others.

It will be appreciated that the components of analysis engines 508 may be related to each other, such that results by one engine may affect the way another engine is used. For example, anger words can be spotted in areas in which high emotional levels are detected.

It will also be appreciated that analysis engines 508 may further comprise any other engines, including a preprocessing engine for enhancing the audio data, removing silence periods or noisy periods, rejecting audio segments of low quality, post processing engine, or others.

Auxiliary components 556 may comprise normalization and injection component 560 for normalizing the interactions and injecting them into a common database so they are handled regardless of their type.

Auxiliary components 556 also comprise advanced analysis engines for further analysis of the main categories or clusters, for retrieving additional information form the interactions. The analysis may include root cause analysis, topic extraction, keyword extraction, link analysis, semantic inference, text entailment, text exploration, information retrieval or the like.

Auxiliary components 556 further comprise user interface components 568 for presenting the information to a user including the sub-categories or clusters and the main multi-channel categories or clusters. User interface components 564 may further enable a user to aggregate sub-categories or clusters into main categories.

Assigning interactions of different types to the same "parent" category or cluster enables the correlation and uniform handling of interactions regardless of their type or origin. This in turn enables better resource allocation and knowledge passing within the organization.

It will be appreciated that the disclosed method and apparatus may have multiple variations. For example, different criteria can be used to determine whether an interaction is important or indicative enough and should be categorized; whether and how it is determined whether an interaction will be further processed, how to process the interactions and how to combine different sub-categories or clusters, etc.

It will be appreciated by a person skilled in the art that the disclosed method and apparatus are exemplary only and that multiple other implementations and variations of the method and apparatus can be designed without deviating from the disclosure. In particular, different division of functionality into components, and different order of steps may be exercised. It will be further appreciated that components of the apparatus or steps of the method can be implemented using proprietary or commercial products.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

What is claimed is:

1. A method for categorizing interactions in a call center of an organization, comprising:
   capturing in the call center at least one vocal interaction and at least one non-vocal interaction, using logging or capturing devices, wherein the at least one vocal interaction and the at least one non-vocal interaction are captured in accordance with pre-defined rules that regulate which interaction is to be captured, and wherein the at least one vocal interaction and the at least one non-vocal interaction having dissimilar contents of common semantic context;
   retrieving at least one first word from the at least one vocal interaction;
   retrieving at least one second word from the at least one non-vocal interaction;
   assigning the at least one vocal interaction into a first category, wherein the first category is based on technical data of the at least one vocal interaction, using the at least one first word;
   assigning the at least one non-vocal interaction into a second category, wherein the second category is based on technical data of the at least one non-vocal interaction, using the at least one second word; and
   associating the first category and the second category into a multi-channel category based on the common semantic context thereof, thus aggregating the at least one vocal interaction and the at least one non-vocal interaction.

2. The method of claim 1 wherein the first category and the second category are pre-determined sub-categories, and wherein associating the first category and the second category comprises unifying the pre-determined sub-categories.

3. The method of claim 1 wherein the first category and the second category are clusters, and wherein associating the first category and the second category comprises unifying the clusters.

4. The method of claim 1 further comprising performing initial filtering for selecting interactions to be processed.

5. The method of claim 4 wherein the initial filtering relates to Computer-Telephony-Integration data or to Customer-Relationship-Management data or to meta data associated with the at least one vocal interaction or the at least one non-vocal interaction.

6. The method of claim 1 further comprising filtering the least one vocal interaction.

7. The method of claim 6 wherein filtering the at least one vocal interaction relates to emotion detection, talk analysis, accent identification or language identification.

8. The method of claim 1 further comprising filtering the least one non-vocal interaction.

9. The method of claim 8 wherein filtering the at least one non-vocal interaction relates to sentiment analysis.

10. The method of claim 1 further comprising normalization and injection of the at least one vocal interaction or the least one non-vocal interaction into a unified format.

11. The method of claim 1 further comprising analyzing the multi-channel category.

12. An apparatus for multi-channel categorizing interactions in a call center of an organization, comprising:
    a logging or capturing component for capturing in the call center at least one vocal interaction and at least one non-vocal interaction, wherein the at least one vocal interaction and the at least one non-vocal interaction are captured in accordance with pre-defined rules that regulate which interaction is to be captured, and wherein the at least one vocal interaction and the at least one non-vocal interaction having dissimilar contents of common semantic context;
    an audio analysis engine for retrieving at least one first word from the at least one vocal interaction;
    a text analysis engine for retrieving at least one second word from the at least one non-vocal interaction;
    a grouping component for assigning the at least one vocal interaction into a first category using the at least one first word and assigning the at least one non-vocal interaction into a second category using the at least one second word, wherein the first category is based on technical data of the at least one vocal interaction and the second category is based on the at least one non-vocal interaction; and
    an aggregation component for associating the first category and the second category based on the common semantic context thereof into a multi-channel category, thus aggregating the at least one vocal interaction and the at least one non-vocal interaction.

13. The apparatus of claim 12 wherein the first category and the second category are pre-determined sub-categories, and wherein the aggregation component unifies the first category and the second category into one or more categories.

14. The apparatus of claim 12 wherein the first category and the second category are clusters, and wherein the aggregation component unifies the first category and the second category into one or more clusters.

15. The apparatus of claim 12 wherein the audio analysis engine is a word spotting engine or a speech to text engine.

16. The apparatus of claim 12 further comprising one or more of the engines selected from the group consisting of: emotion detection engine; talk analysis engine; call flow analysis engine; accent identification engine; and language identification engine.

17. The apparatus of claim 12 further comprising a normalization and injection component for normalizing and injecting the at least one vocal interaction or the least one non-vocal interaction into a unified format.

18. The apparatus of claim 12 further comprising an advanced analysis engine for analyzing the multi-channel category.

19. The apparatus of claim 12 further comprising a filtering component for filtering out interactions unsuitable for further analysis.

20. A non-transitory computer readable storage medium containing a set of instructions for a general purpose computer, the set of instructions comprising:

capturing in the call center at least one vocal interaction and at least one non-vocal interaction, using logging or capturing devices, wherein the at least one vocal interaction and the at least one non-vocal interaction are captured in accordance with pre-defined rules that regulate which interaction is to be captured, and wherein the at least one vocal interaction and the at least one non-vocal interaction having dissimilar contents of common semantic context;

retrieving at least one first word from the at least one vocal interaction;

retrieving at least one second word from the at least one non-vocal interaction;

assigning the at least one vocal interaction into a first category, wherein the first category is based on technical data of the at least one vocal interaction, using the at least one first word;

assigning the at least one non-vocal interaction into a second category, wherein the second category is based on technical data of the at least one non-vocal interaction, using the at least one second word; and associating the first category and the second category into a multi-channel category based on the common semantic context thereof, thus aggregating the at least one vocal interaction and the at least one non-vocal interaction.

\* \* \* \* \*